United States Patent [19]

Clauw et al.

[11] Patent Number: 4,958,799
[45] Date of Patent: Sep. 25, 1990

[54] SEAT TRACK LATCH ANTI-RATTLE RELEASE WIRE

[75] Inventors: Mitchell J. Clauw, Sterling Heights; Neal G. Stupera, Fraser; Theodore W. Tobin; Dennis M. Viscome, both of Taylor, all of Mich.

[73] Assignee: Chrysler Corporation, Highland Park, Mich.

[21] Appl. No.: 451,902

[22] Filed: Dec. 18, 1989

[51] Int. Cl.⁵ .............................................. F16M 13/00
[52] U.S. Cl. ..................................... 248/430; 297/344
[58] Field of Search ............... 248/430, 429, 424, 425; 297/344

[56] References Cited

U.S. PATENT DOCUMENTS

| | | | |
|---|---|---|---|
| 3,220,690 | 11/1965 | Caughey | 248/430 |
| 3,310,274 | 3/1967 | Tanaka et al. | 248/430 |
| 3,450,425 | 6/1969 | Leonhardt | 248/430 |
| 3,479,099 | 11/1969 | Krause | 248/429 X |
| 4,004,772 | 1/1977 | Pickles | 248/430 |
| 4,635,890 | 1/1987 | Matsuda et al. | 248/429 |
| 4,652,052 | 3/1987 | Hessler et al. | 248/430 X |
| 4,742,983 | 5/1988 | Nihei | 248/429 |
| 4,775,126 | 10/1988 | Yokoyama | 248/430 |
| 4,852,846 | 8/1989 | Weier | 248/430 |

FOREIGN PATENT DOCUMENTS

| | | | |
|---|---|---|---|
| 0278441 | 12/1986 | Japan | 248/429 |
| 0125928 | 6/1987 | Japan | 248/424 |
| 0306942 | 12/1988 | Japan | 248/430 |

Primary Examiner—David L. Talbott
Assistant Examiner—Daniel Hulseberg
Attorney, Agent, or Firm—Edward P. Barthel

[57] ABSTRACT

A vehicle seat structure is mounted on right and left track assemblies whereby the seat is longitudinally adjustable. A release wire interconnects right and left latch mechanisms such that upon a handle bar unlocking the right mechanism the left mechanism is similarly unlocked in a master-slave manner. An improved release wire attaching arrangement is provided imparting a predetermined twisting torque to the wire that its integral hair-pin end connectors are each resiliently biased into rattle-free positive contact with its associated latch mechanism mounting.

1 Claim, 3 Drawing Sheets

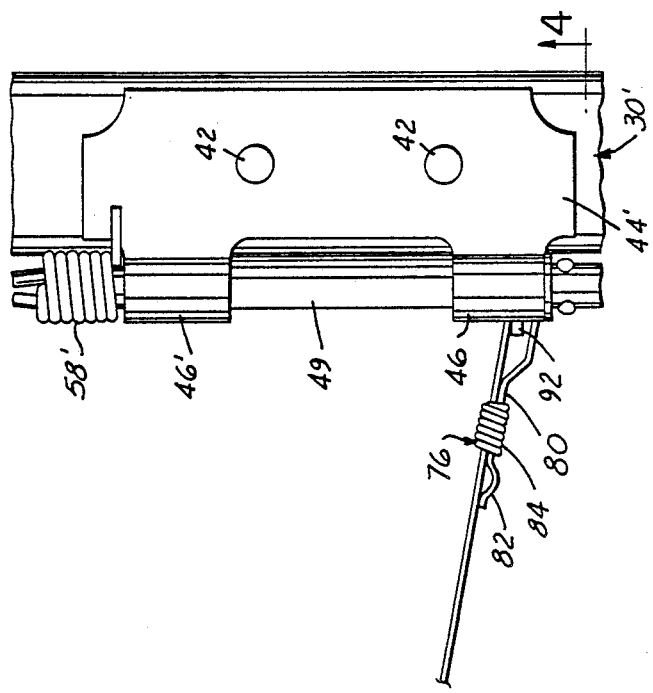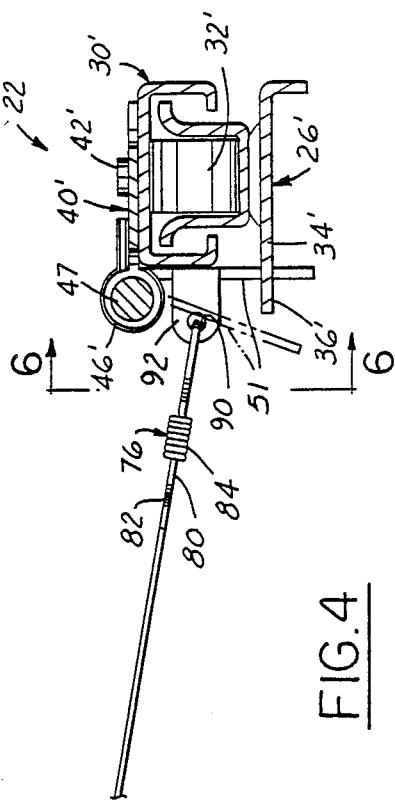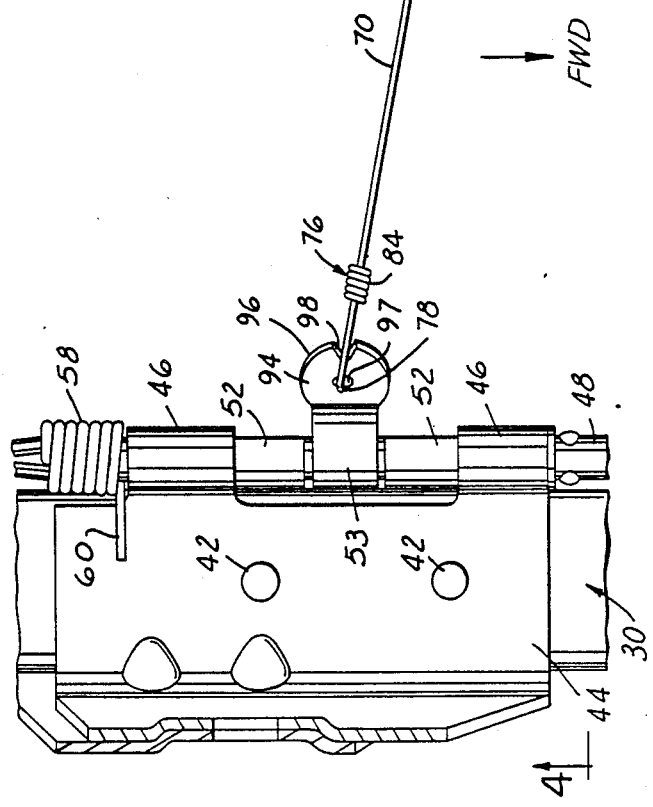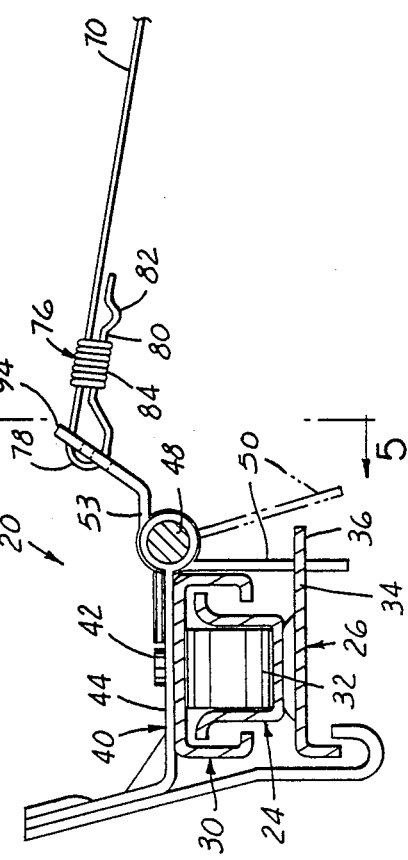
FIG.3
FIG.4

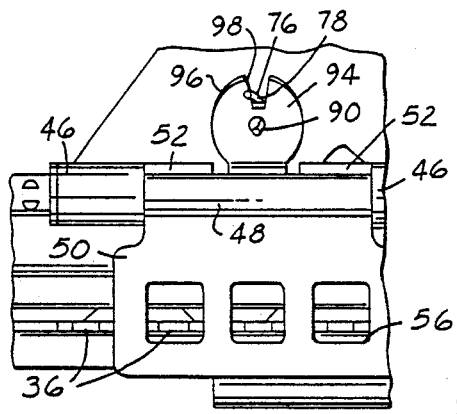
FIG.5
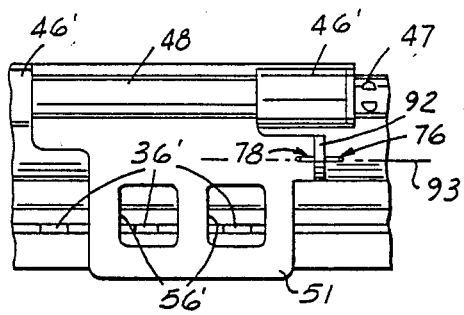
FIG.6
FIG.5A
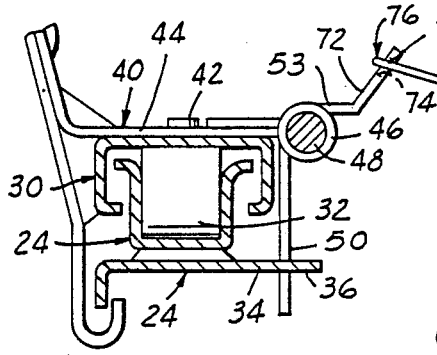
(PRIOR ART)
FIG.7
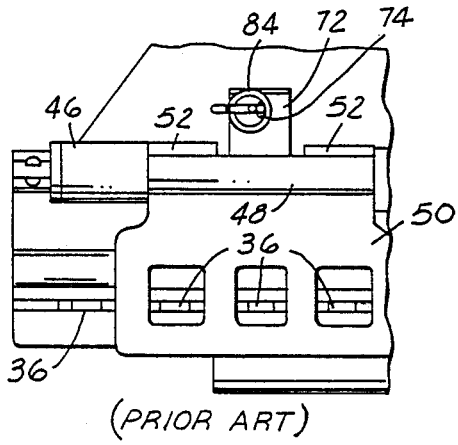
(PRIOR ART)
FIG.8
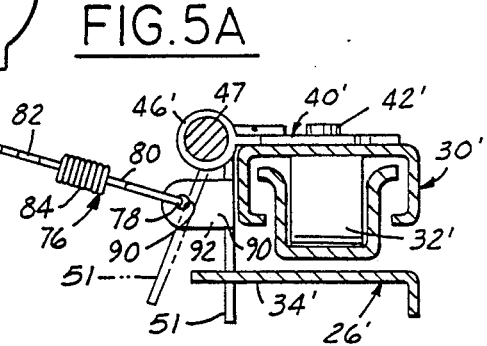
(PRIOR ART)
FIG.10
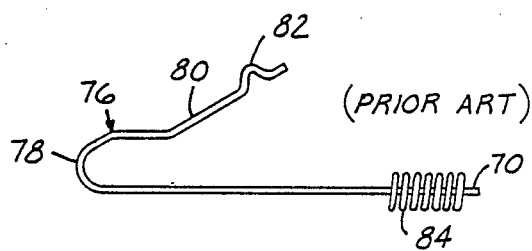
(PRIOR ART)
FIG.9

SEAT TRACK LATCH ANTI-RATTLE RELEASE WIRE

INTRODUCTION

This invention relates to a vehicle seat track assembly and more particularly, to a seat track position control arrangement having an improved release wire connection to obviate rattles.

BACKGROUND OF THE INVENTION

The U.S. Pat. No. 4,635,890, issued Jan. 13, 1989 to Matsuda, et al., discloses a lock mechanism for an adjustable seat wherein the seat is mounted on right and left slide rails slidable on right and left guide rails so that the position of the seat is adjustable back and forth. Right and left lock mechanisms are mounted on the right and left slide rails, respectively, for locking relative movement between a right or left pair of the slide and guide rails.

SUMMARY OF THE INVENTION

It is an object of the present invention to provide first and second seat support track assemblies for supporting a vehicle seat structure in such a manner that the position of the seat structure is longitudinally adjustable having an improved readily attached release wire mounting arrangement that obviates the development of noise and vibration conditions.

It is another object of the present invention to provide an improved release wire mounting arrangement as set forth above wherein the installer automatically imparts a twisting torque in the release wire thereby biasing the wire integral hair-pin connectors into positive anti-rattle contact with their associated mounting tabs.

BRIEF DESCRIPTION OF THE DRAWINGS

The above and other related objects and features of the invention will be apparent from a reading of the following description of the disclosure found in the accompanying drawings wherein:

FIG. 3 is a fragmentary top elevational view of the track assembly latch mechanisms of FIG. 2;

FIG. 4 is a fragmentary sectional view taken generally along the plane indicated by line 4—4 of FIG. 3;

FIG. 5 is a fragmentary elevational view, partly in section, taken generally along the plane indicated by line 5—5 of FIG. 4;

FIG. 5A is a fragmentary detail plan view of the tab connector 94 of FIG. 5;

FIG. 6 is a fragmentary elevational view, partly in section, taken generally along the plane indicated by line 6—6 of FIG. 4;

FIG. 7 is a fragmentary sectional view similar to FIG. 4 of a prior art type;

FIG. 8 is a fragmentary elevational view similar to FIG. 5 of a prior art type;

FIG. 9 is a fragmentary elevational view of a prior art release wire connection in its closed mode; and FIG. 10 is a view similar to FIG. 9 of a prior art release wire connection in its open mode.

DESCRIPTION OF THE PREFERRED EMBODIMENT

Figure 1:
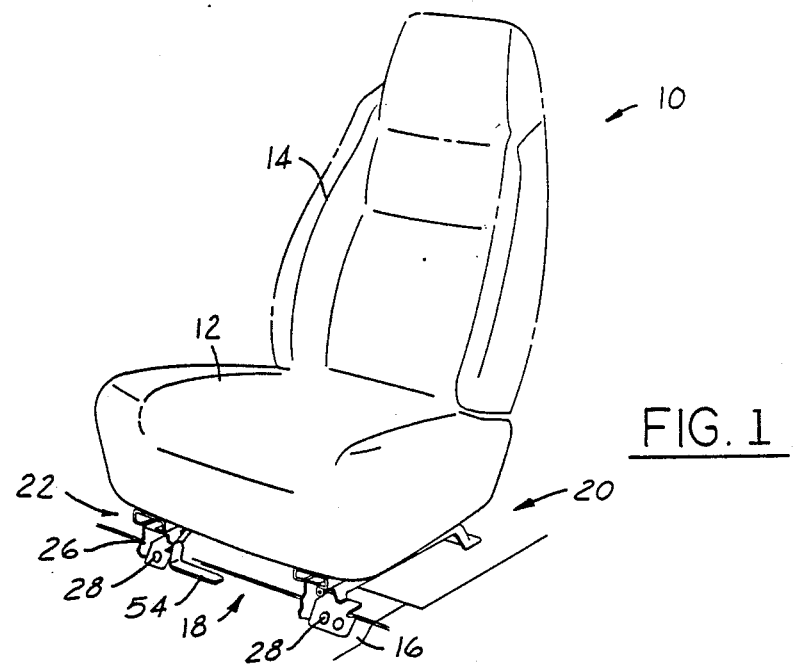
FIG. 1 is a perspective view of an automobile seat structure embodying the anti-rattle release wire connections of the present invention.

Referring now to FIG. 1 of the drawings, a vehicle seat assembly 10 according to the present invention is shown positioned in the passenger compartment of a motor vehicle. The seat assembly 10 is on the driver's side in the form shown, thus the near side of the seat assembly in FIG. 1 is the outboard side of the vehicle, The vehicle seat assembly 10 includes a seat cushion 12 and a seat back 14 with the seat cushion 12 supported on the vehicle floor pan 16 by a seat slide structure, generally indicated at 18 in FIG. 2.

Figure 2:
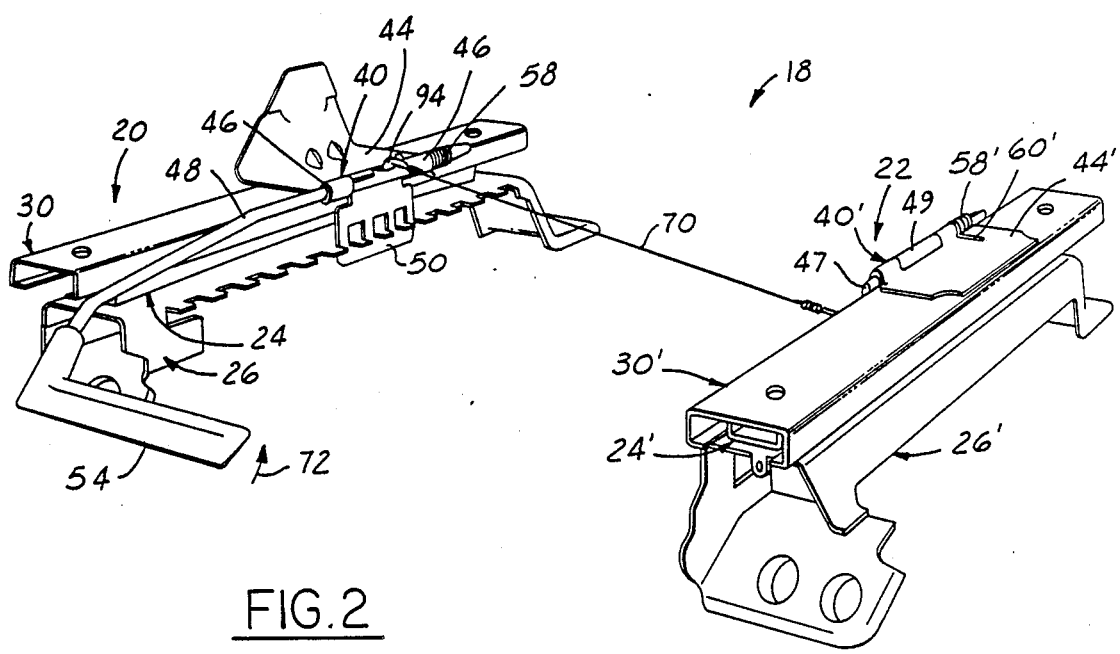
FIG. 2 is a perspective view of the seat support track assemblies of FIG. 1.

The seat slide structure 18 comprises an inboard or first track assembly 20 and a parallel outboard or second track assembly 22 with the track assemblies being laterally spaced and longitudinally extending. The slide structure 18 provides fore and aft horizontal movement of the seat assembly 10 to a plurality of adjusted positions. As seen in FIG. 2, the first track assembly 20 comprises an inboard first lower U-shaped guide rail 24 secured to the floor pan 16 by means of an integral inboard first bracket 26 bolted at 28 to the floor pan 16. The guide rail 24 is welded to the lower bracket 26 as shown in FIG. 4. The first track assembly 20 has a first upper C-shaped slide rail 30 which envelopes its associated lower guide rail 24 and is relatively slidably supported with respect thereto by bearing means indicated at 32 in FIG. 4.

FIGS. 2 and 4 show the first bracket 24 having a laterally outboard extending flange 34 formed with a longitudinally extending series of detent locking teeth 36. The first upper slide rail 30 has a first latch mechanism 40 fixed thereon by bolts 42. The first latch mechanism comprises a hinge plate 44 formed with a pair of hinge knuckles 46 receiving a longitudinally extending operating pivot bar 48 therethrough for pivotal movement about a longitudinal pivot axis. A first latch plate 50 has a pair or arcuate ears 52 welded to the bar 48 together with an intermediate horizontally extending finger 53. Upon the operator lifting operating bar handle 54 (FIG. 2). Lifting the handle 54 causes the first latch plate 50 to be pivoted in a counter-clockwise direction, as viewed in FIG. 4, from its vertically disposed locked position to an unlocked position indicated in dashed lines.

The first latch plate 50 includes a plurality of windows 56 with each window adapted to receive an associated detent tooth 36 therein (FIG. 5) in its locked position. FIG. 3 shows a coil spring 58 encircling the aft end of the operating bar 48 with spring finger 60 overlying the hinge plate 44. The coil spring 58 resiliently biases the latch plate 50 in its vertically disposed locked position.

As illustrated in FIGS. 2, 3 and 4 the outboard second track assembly 22 is essentially a mirror image of the first track assembly. Consequently, the same or corresponding parts will be indicated by the same numerals, except that they will be primed. The second track assembly 22 comprises an outboard second lower U-shaped guide rail 24' secured to the floor pan 16 by means of an integral outboard secured bracket 26' bolted at 28' to the floor pan 16. The guide rail 24' is welded to the lower bracket 26' as shown in FIG. 4.

The second track assembly 22 has a second upper C-shaped slide rail 30' which envelopes its associated lower guide rail 24' and is relatively slidably supported therein by bearing means 32'. The bracket 26' has an inboard extending lateral flange 34' formed with a longitudinally extending series of detent locking teeth 36'. The second upper slide rail 30' has a second latch mechanism 40' fixed thereon by bolts 42'.

The second latch mechanism 40' comprises a hinge plate 44' formed with a pair of hinge knuckles 46' receiving a longitudinally extending pivot pin 47 therethrough for pivotal movement about a longitudinal pivot axis. A second latch plate 51 has a central ear 49 welded to the pin 47 for pivotal movement in a clockwise direction, as viewed in FIG. 4, from its vertically disposed locked position to an unlocked position indicated in dashed lines.

The second latch plate 51 includes a plurality of windows 56' (FIG. 6) with each window adapted to receive an associated detent tooth 36' therein in the latch plate's locked position. As seen in FIG. 3 a coil spring 58' encircles the aft end of pin 47 with spring finger 60' overlying the hinge plate 44'. The coil spring 58' resiliently biases the second latch plate 51.

It will be seen in FIG. 2 that the bar 48 and its handle 54 are connected with the second latch plate 51 of the second lock mechanism through a release wire 70. When the handle 54 is rotated upwardly in a direction shown by arrow 72 in FIG. 2, the first latch plate 50 is swung counter-clockwise and the first latch mechanism 40 is unlocked. At the same time, the second latch plate 51 of the second latch mechanism 40' is swung in a clockwise direction to its dashed line position of FIG. 4 through the release wire 70, thereby unlocking the second latch plate 51.

Prior art FIG. 7 depicts the conventional arrangement for connecting the release wire 70 to the first latch plate 50. FIG. 7 shows the latch plate intermediate finger 53 of the latch plate 50 having an upwardly angled tab portion 72 bent upwardly from the horizontal at an acute angle of about 60°, formed with a connection hole 74. The tab portion connection hole 74 is adapted for engagement with identical integral hair-pin type connector assemblies 76 provided at each end of the release wire 70. FIGS. 9 and 10 show one hair-pin connector assembly 76 formed with a return-bend enlarged half-circle loop portion 78, adapted for hooked engagement in the tab portion connection hole 74, followed by a linear spring tail portion 80 terminating in a raised bump 82. Upon the loop 78 of open unlocked connector assembly 76 (FIG. 10) being hooked in the connection hole 74, the spring tail portion 80 is urged toward the release wire 70 enabling a slidable wire coil retainer 84 encircling the wire to be shifted over the bump 82 to its FIG. 9 closed and locked position captured between the loop 78 and the bump 82.

In FIG. 7, the opposite hair-pin connector loop portion 78 is shown hooked in second connection hole 90 formed in a transversely extending right angled lateral flange 92 struck from the forward edge of the second latch plate 51. The principal axis 93 of the second connection hole 90 extends longitudinally as seen in FIG. 6. It will be appreciated that production economy requires that the release wire 70 hair-pin connectors 76 be formed such that the integral loop and tail portions at each end are normally co-planar, as seen in prior art (FIG. 9).

It has been found in practice that if the release wire 70 is installed as shown in prior art FIG. 9, it may develop a rattle condition unless all manufacturing tolerance conditions are met. To obviate such a rattle condition assembly-line installation instructions require the installer to impart a twisting torque to the release wire during assembly. Thus, for example, upon one hair-pin connector 76 being attached in its connection hole 90 of the second track assembly 22 with the tail portion 80 facing forward as seen in prior art FIG. 7, the installer twists the other connector 76 through an approximate 180° angle prior to hooking the loop portion 78 through its associated connection hole 74. The induced twisting torque in the release wire 70 causes each hair-pin connector 76 to be hooked in spring biased positive rattle free contact with its associated connection hole tab 72 and lateral flange 92. It has been found in practice, however, that occasionally the assembly line installer may forget to impart a twisting torque to the release wire 70 thereby creating a potential noise or vibration problem in the finished vehicle seat assembly 10 that is difficult to locate and costly in man hours to repair.

The present invention obviates the above-described prior art problem by means of a unique solution. As seen in FIGS. 3, 4 and 5 the latch plate intermediate horizontally extending finger 53 is bent to provide upwardly angled tab portion terminating in a disk-shaped portion 94 formed at the tab portion 93 upper end. FIG. 5A shows the disk-shaped portion 94 defining an outer semi-circular periphery 96 formed with a center hole 97 and an upwardly opening radial notch 98. It will be noted in FIG. 5 that the radial notch 98 has slightly diverging mirror image side edges and that the semicircular periphery 96 extends through an arc of about 300°.

Thus, as seen in FIGS. 3 and 4, the installer initially connects one hair-pin connector assembly 76 to the disk-shaped portion 94 of the first latch mechanism 40. This is done by inserting the tab portion 80 of one open hair-pin connector assembly 76 through the center hole 97 such that its loop portion 78 is hooked in the upper radial notch 98. Upon the coil retainer 84 being slid to its locked position shown, the loop portion 78 is trapped and held in a substantially vertical plane.

The installer next swings out the latch plate 51 of the second latch mechanism 40' and mounts the tail portion 80 of the other open hair-pin connector assembly 76 through the connection hole 90. It will be seen that as the principal axis of connection hole 90 extends longitudinally its associated hair-pin connector 76 is oriented in a plane of the release wire 70 that is rotated substantially 90° from the substantially vertical plane of the one hair-pin connector 76 associated with the disk-shaped portion 94. Thus, with the one hair-pin connector 76 attached to its associated disk-shaped portion 94 the release wire 70 is twisted by the installer about 90° in one direction imparting a predetermined twisting torque to the release wire 70. This torque is sufficient to resiliently bias each hair-pin connector 76 into positive rattle-free contact with its respective disk-shaped tab portion 94 and lateral flange portion 92.

Although a preferred embodiment of the invention has been illustrated and described in detail, it will be understood that various changes and modifications may be made in the disclosed embodiment without departing from the scope and spirit of the invention as defined in the appended claims.

What is claimed is:

1. A vehicle seat support mechanism for support a seat on a vehicle so that the position of the seat is adjustable fore and aft, comprising:

laterally spaced first and second parallel track assemblies mounting the seat on the vehicle for longitudinal movement to a plurality of fore and aft adjusted positions;

said first track assembly including a first lower guide rail mounted to the vehicle and a first upper slide rail slidable on said first lower guide rail to the fore and aft positions and a second lower guide rail mounted to the vehicle and a second upper slide rail slidable on said second lower guide rail to the fore and aft positions;

a first latch member which locks said first slide rail to said first guide rail when said first latch member in a lock position, and unlocks said first slide rail so that said first slide rail is slidable relative to said first guide rail when said first latch member is in an unlock position;

a second latch member which locks said second slide rail to said second guide rail when said second latch member is in a lock position, and unlocks said second slide rail so that said second slide rail is slidable relative to said second guide rail when said second latch member is in an unlock position;

an operating bar being connected with said first latch member so that said first latch member can be moved to the unlock position by said operating means, a transversely extending release wire connected between said operating bar and said second latch member, for transmitting motion from said operating bar to said second latch means so that said second latch means is moved to the unlock position together with said first latch means by movement of said operating bar, said release wire having identical hair-pin connectors integrally formed at each end thereof, each said connector formed a return-bend enlarged loop portion adapted for hooked engagement with aperture means in an associated first and second latch plate for simultaneous operation of said first and second latch members each said loop portion terminating on a linear resilient tail portion formed with a raised bump, each said tail portion normally defining an acute angle with said release wire, and a pair of retainer members slidably disposed on said wire whereby each of said retainer members adapted to capture a tail portion of its associated connector upon the tail portion being flexed juxtaposed said release wire, and whereby each said hair-pin connector lying on a common plane that includes said release wire, the improvement wherein, said first track assembly latch plate having a disk-shaped upstanding portion lying in a longitudinally extending plane sloped upwardly and toward said second track assembly, said disk-shaped portion having a central connector hole therein, said disk-shaped portion defining a semi-circular periphery concentric with said central hole, said disk-shaped portion formed with a radial upwardly opening notch therein at an upper and outermost point along its periphery, said second track assembly latch plate having a transversely extending, vertically disposed connector flange extending toward said first track assembly, said connector flange having a connector hole oriented with its principal axis disposed longitudinally and parallel with the second track assembly;

whereby upon said one hair-pin connector being connected in a generally vertically oriented manner to said disk-shaped portion with the release wire linear portion nested in said radial notch and its tail portion extending through said disk-shaped portion central opening, such that said other hair-pin connector being connected in a generally horizontally oriented manner to said connector flange hole thereby imparting a predetermined twisting torque of substantially 90° in said release wire so as to resiliently bias each said connector into positive contact with its associated track assembly mounting providing a rattle-free attachment of each said hair-pin connector.

* * * * *